United States Patent [19]
Kroeger et al.

[11] Patent Number: 5,598,441
[45] Date of Patent: Jan. 28, 1997

[54] CARRIER ACQUISITION TECHNIQUE FOR MOBILE RADIO QPSK DEMODULATOR

[75] Inventors: Brian W. Kroeger, Sykesville; Joseph B. Bronder, Elkridge; Jeffrey S. Baird, Baltimore, all of Md.

[73] Assignee: Westinghouse Electric Corp., Pittsburgh, Pa.

[21] Appl. No.: 322,840

[22] Filed: Oct. 13, 1994

[51] Int. Cl.$^6$ ................................... H03D 1/00
[52] U.S. Cl. ................ 375/344; 455/192.1; 455/192.2
[58] Field of Search ................. 375/344; 455/182.1, 455/182.2, 192.2, 192.1, 255, 257, 259, 265

[56]     References Cited

U.S. PATENT DOCUMENTS

| 4,143,322 | 3/1979 | Shimamura | 325/320 |
| 4,318,049 | 3/1982 | Mogenson | 329/50 |
| 4,466,108 | 8/1984 | Rhodes | 375/83 |
| 4,787,096 | 11/1988 | Wong | 375/120 |
| 4,879,728 | 11/1989 | Tarallo | 375/80 |
| 5,212,817 | 5/1993 | Atkinson | 455/161.2 |
| 5,438,692 | 8/1995 | Mohindra | 375/344 |
| 5,444,736 | 8/1995 | Kawashima et al. | 375/344 |
| 5,450,621 | 9/1995 | Kianush et al. | 455/192.2 |

OTHER PUBLICATIONS

Connelly, "Design of the Westinghouse Series 1000 Mobile Phone," IEEE, pp. 347–350, May 18, 1993.
Connelly, "The Westinghouse Series 1000 Mobile Phone: Technology and Applications," IEEE, pp. 375–379, May 18, 1993.

*Primary Examiner*—Stephen Chin
*Assistant Examiner*—Huong Luu
*Attorney, Agent, or Firm*—C. O. Edwards

[57]     ABSTRACT

A method and apparatus for estimating a frequency of a received carrier wave in a Quadrature Phase Shift Keying (QPSK) system. The invention uses a combination of an FFT, DFT bins, and three point interpolation to estimate a frequency of the carrier wave. The system is robust and compensates for multipath fading and other types of signal degradation.

17 Claims, 9 Drawing Sheets

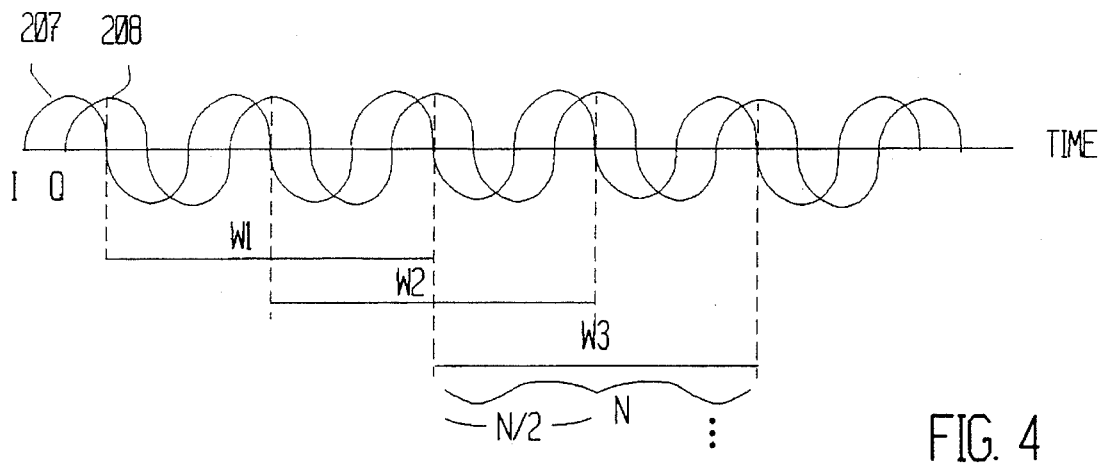
FIG. 4
| AMP 1 VALUE 0 | ... | AMP 1 VALUE N-1 |
|---|---|---|
| 0 | ... | 255 |
FIG. 5
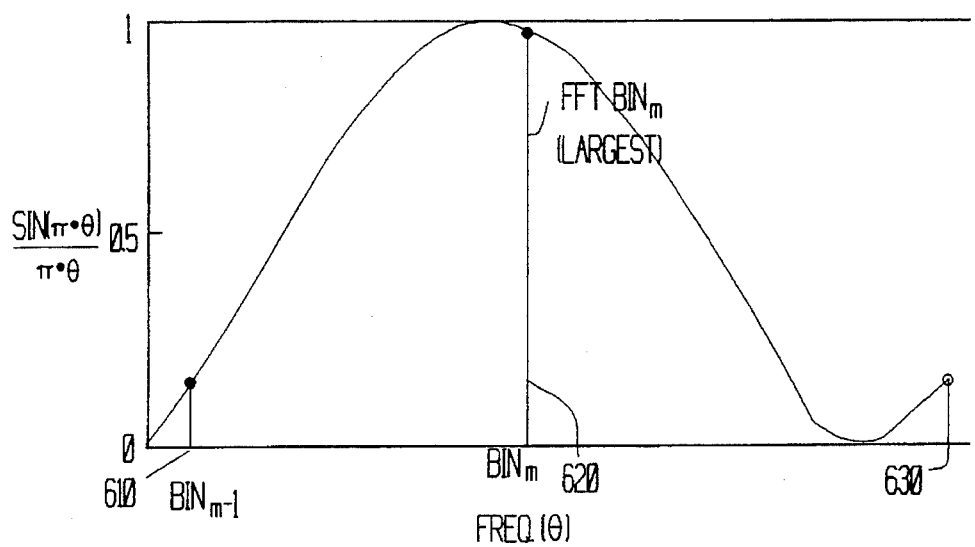
FIG. 6

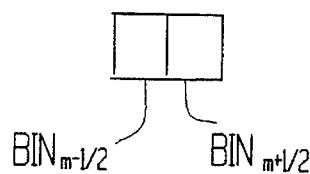 
FIG. 7A  FIG. 7B
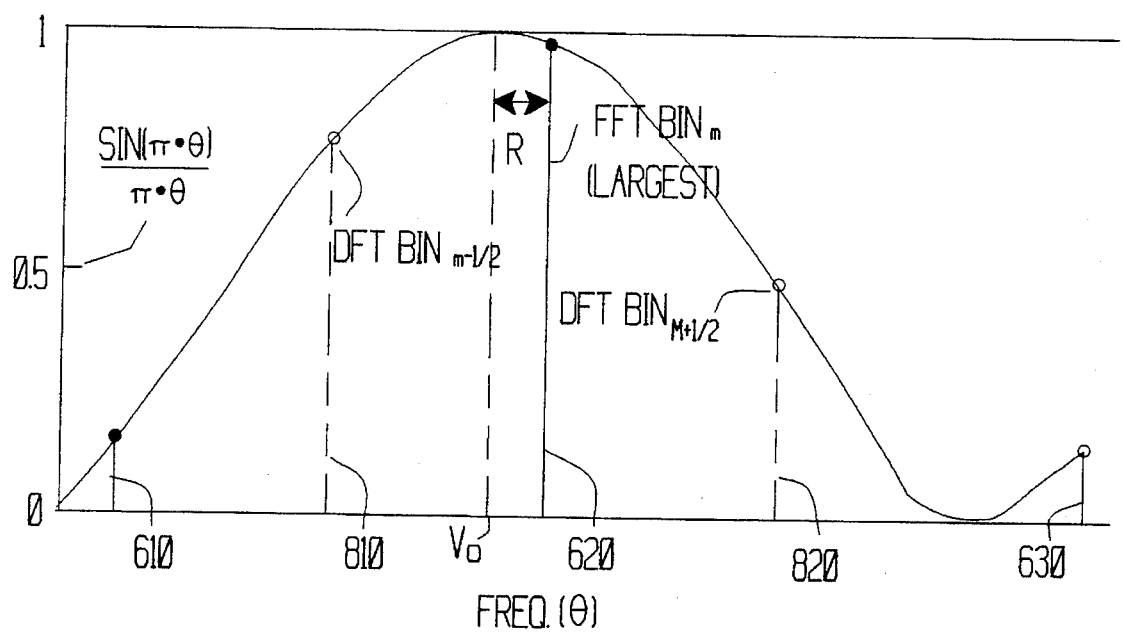
FIG. 8

CARRIER ACQUISITION TECHNIQUE FOR MOBILE RADIO QPSK DEMODULATOR

BACKGROUND OF THE INVENTION

This application relates to a mobile terminal for a communication system; and more particularly to a receiving method and apparatus for processing signals of a communication system.

While the invention is subject to a wide range of applications, it is especially suited for use in a digital satellite communication system and is described in that connection.

RELATED APPLICATIONS

U.S. patent application entitled "Mobile Terminal Apparatus and Method For A Satellite Communication System" filed by Albert J. Fasulo II, Denise M. Cammarata, Keith W. Janson, Samuel S. Anderson, Raymond R. Cooper, and Roy Stehlik, on the same date as the instant application which is a continuation-in-part of U.S. patent application Ser. No. 08/242,400 filed May 13, 1994, is incorporated by reference.

U.S. patent application Ser. No. 08/322,846 entitled "Locally Coherent QPSK Detection With Differential Decoding For A Fading Channel" filed by Brian W. Kroeger, Joseph B. Bronder, and Jeffrey S. Baird, on the same date as the instant application is incorporated by reference.

U.S. patent application Ser. No. 08/322,833 entitled "A Digital Quadriphase-Shift Keying Modulator" filed by Brian W. Kroeger and Roy Stehlik on the same date as the instant application, is incorporated by reference.

U.S. patent application Ser. No. 08/322,845 entitled "Numerically Controlled Oscillator With Complex Exponential Outputs Using Recursion Technique" filed by Brian W. Kroeger and Jeffrey S. Baird on the same date as the instant application, is incorporated by reference.

U.S. patent application Ser. No. 08/322,847 entitled "Carrier Tracking Loop For QPSK Demodulator" filed by Brian W. Kroeger, Jeffrey S. Baird, and Joseph B. Bronder on the same date as the instant application, is incorporated by reference.

U.S. patent application Ser. No. 08/322,854 entitled "Symbol Synchronizer Using Modified Early/Punctual/Late Gate Technique" filed by Brian W. Kroeger, Joseph B. Bronder, Tod A. Oblak, and Jeffrey S. Baird, on the same date as the instant application, is incorporated by reference.

DESCRIPTION OF RELATED ART

In a typical satellite communication system, outgoing RF signals transmitted from a mobile terminal unit are received directly by the satellite. The satellite in turn retransmits the RF signals to a ground station that is connected by wire to a public switched telephone network (PSTN), which in turn routes the outgoing signals to either a conventional telephone or to another mobile terminal unit of a satellite or cellular network. Incoming signals from a conventional wired telephone are conducted from the PSTN to the satellite ground station, which in turn transmits RF signals to the satellite for retransmission to the mobile terminal unit. Thus, communication can be between two mobile terminal units or between a mobile terminal unit and a conventional telephone connected to a PSTN, or between a satellite mobile terminal unit and a cellular mobile terminal unit for example. In each of the aforesaid conditions (except mobile terminal to mobile terminal), the communication is routed through a PSTN.

It has been proposed, to provide a satellite communications network that utilizes geosynchronous satellites, each of which is capable of covering an area corresponding to a substantial portion of the North American continent, so that one satellite with approximately six beams will cover the entire continent from Alaska to Mexico. The satellites for such a network will be approximately 22,600 miles above the equator and will be designed to operate in the L-Band of RF frequencies. For example, the frequency of the signal being transmitted to the satellite will be between 1626 MHz to 1660 MHz, and the frequency of the signal received from the satellite will be between 1525 MHz to 1559 MHz. Energy travelling this great distance undergoes huge attenuation such that the power flux density incident at the antenna of the mobile unit is approximately $10^{-14}$ watts per square meter. This grossly attenuated signal is further degraded by noise, and other satellite channel impairments such as Rician fading due to multipath-fading.

Conventional mobile terminal units capable of receiving signals of this order of magnitude are either limited to paging signals or require extremely sophisticated hardware, which is bulky and heavy and does not lend itself to mobility. Also, the limited functions and expense of such terminal equipment would prevent its acceptance among a large segment of potential users. In light of the foregoing, there is a need for a mobile terminal unit that is not only capable of reliably receiving the attenuated signals, subject to Rician fading, of a high altitude satellite for voice, facsimile, and data communication, but also compact, lightweight, and relatively inexpensive to manufacture.

The receiving portion of many mobile terminal units receives a signal that is encoded using a differential Quadrature Phase Shift keyed (QPSK) method. In QPSK systems, a demodulator receives and decodes quadrature phase shift keyed information. The received signal includes 1) a preamble having a predetermined frequency that enables the demodulator to determine the frequency of a carrier wave and 2) a message to be demodulated. Before any significant processing of the message can be performed, the demodulator must first examine the preamble to determine the frequency of the carrier wave (CW) of the signal.

Some conventional systems demodulate the carrier wave signals by performing a Fast Fourier Transform (FFT) on the received carrier wave signal as the sole determinate of the carrier wave frequency, which yields an approximation of the frequency of the carrier wave. To perform an FFT, a number of samples are taken of the received preamble signal over time. The sample rate does not directly impact the accuracy of the frequency calculation, but does effect the amount of processing required. The accuracy (or, more properly, the resolution) of a frequency analysis is inversely proportional to the length of time spanned by the data that forms the input to the analysis. For example, spectral analysis of a 10 msec segment is half as accurate as one of a 20 msec segment. (For example, a spectral analysis of a 10 msec of data can isolate two tones that are 100 Hz apart whereas an analysis of 20 msec of data would be required to recognize two tones only 50 Hz apart.) The higher the sample rate, the greater the number of samples in a given period of time. So for a given spectral accuracy, a higher sample rate requires more processing.

In some mobile systems, the oscillator of either the sending or receiving system may introduce frequency error. Moreover, the motion of a vehicle in which a sending or receiving station is mounted will cause unknown Doppler shifts. In addition, the received preamble signal often contains noise and other interference, which make the frequency determination more difficult. For example, a signal may experience multi-path fading (Rician fading) caused by the signal being reflected from buildings or terrain. The presence of noise and unwanted signals in a received preamble signal including a carrier wave introduces error in the frequency estimate. A fading signal tends to spread the frequency spectrum, thus making it difficult to determine a carrier wave frequency.

One conventional frequency estimate technique uses a two-point interpolation process to estimate a frequency of the carrier wave. Two point interpolations perform acceptably when a received signal is relatively noise-free and when the signal does not fade. Problems arise, however, when the signal is noisy and/or when the signal experiences fading. Signal noise and fading can cause significant problems in a two point interpolation process. For example, noise and fading can cause a system to make inaccurate estimates of the carrier signal frequency, thus causing failure of the demodulation of a received message. In light of the foregoing, there is a need for a method and apparatus for estimating the frequency of a carrier wave that minimizes the effect of fading, noise, and Doppler shift.

SUMMARY OF THE INVENTION

The present invention is directed to a method and format that overcomes the problems and disadvantages of the prior art.

In accordance with the purpose of the invention, as embodied and broadly described herein, the invention is a mobile terminal having an RF receiver, and a digital signal processor, the digital signal processor including means for performing a Fast Fourier Transform (FFT) on the received carrier wave signal to store values in a plurality of bins stored in a memory, each bin containing a value indicative of energy of the respective frequencies; means for determining that one of the plurality of bins is an mth bin having the largest energy; means for performing a three point interpolation process to yield a signal R representing a relationship between the mth bin and one of an (m+½)th bin and an (m−½)th bin; and means for adding the signal R to a signal representing a frequency signal corresponding to the estimated frequency.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4 is a graph of a received carrier wave showing three overlapping sampling windows;

FIG. 5 is a diagram of bins stored in a memory holding the result of a Fast Fourier Transform;

FIG. 6 is a graph showing a partial output of the Fast Fourier Transform step of FIG. 3;

FIGS. 7A and 7B are diagrams of memory locations used in a three point interpolation process;

FIG. 8 is a graph showing a partial result of performing the three point interpolation on the Fast Fourier Transform output of FIG. 6;

DETAILED DESCRIPTION OF A PREFERRED EMBODIMENT

Reference will now be made in detail to a preferred embodiment of the invention, examples of which are illustrated in the accompanying drawings. Wherever possible, the same reference numbers will be used throughout the drawings to refer to the same or like parts.

Figure 1:
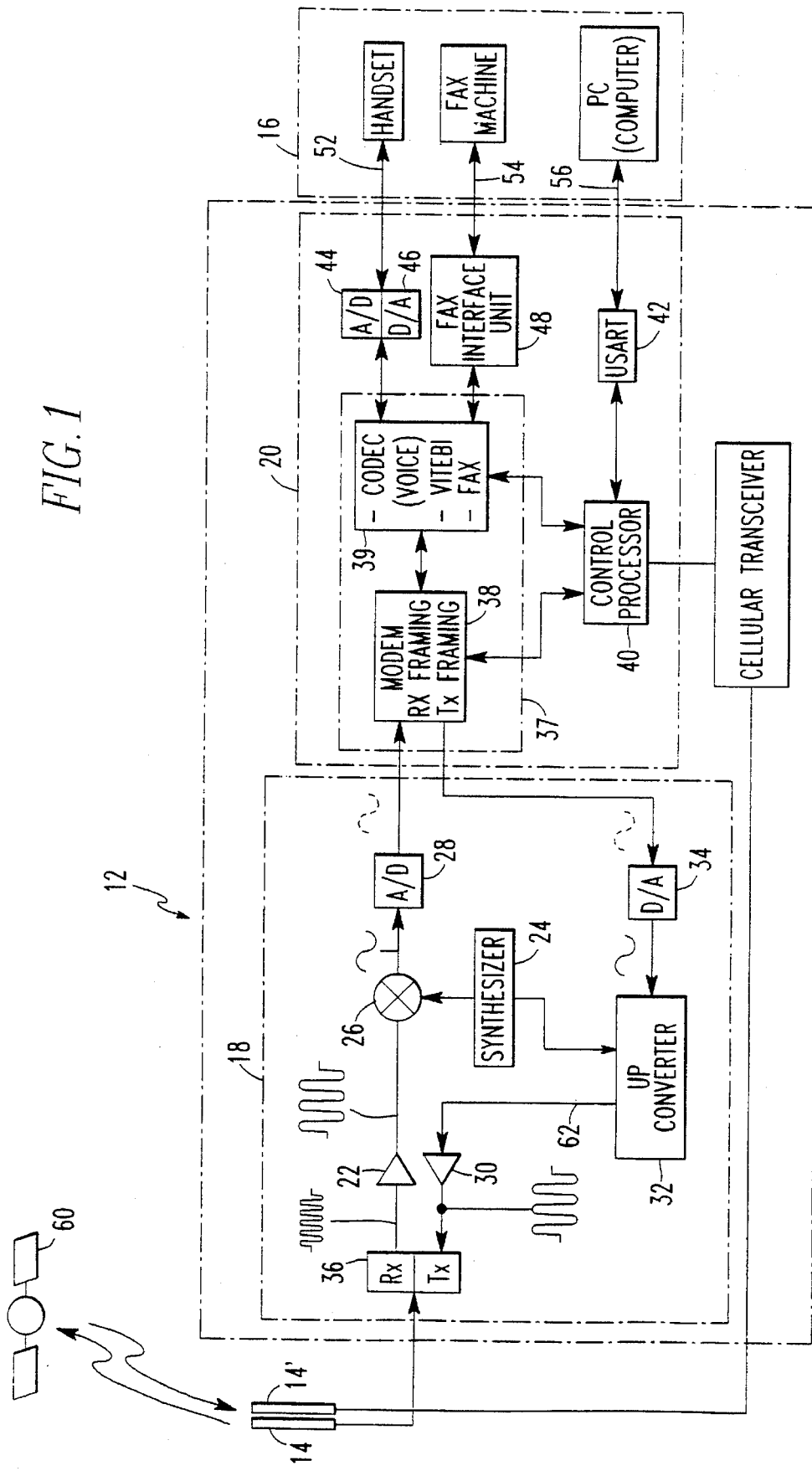
FIG. 1 is a schematic block diagram of a mobile terminal apparatus.

FIG. 1 shows a mobile terminal unit comprising a transceiver 12, an antenna 14, and one or more user interfaces 16. The transceiver 12 has an RF section 18 and a processor board 20.

The RF section has a receiving portion that includes a low noise amplifier 22, a down converter 26, and an analog to digital converter (A/D) 28. The RF section also has a transmitter portion that includes a high power amplifier (HPA) 30, an upconverter 32, signal line 62, and digital-to-analog converter (D/A) 34. The antenna 14 is connected to the RF section through a diplexer 36.

The processor board has a digital signal processor 37 including a modem processor 38 and a coder/decoder and fax processor 39, a control processor 40, a universal asynchronous receiver/transmitter (UART) 42, an A/D converter 44, a D/A converter 46, a FAX interface unit 48. The user interfaces 16 of the terminal unit include an output 52 for a handset, an output 54 for a facsimile machine and an output 56 for connection to a personal computer. The apparatus may also include a cellular transceiver board.

The transmit signal begins in the processor board 20 as digital data, which is then converted into digitized, modulated waveform samples. This digitized waveform, which is created by the processor 37, is conducted to the digital-to-analog (D/A) converter 34 before the upconverter 32 of the RF section. The converter 34 converts the digitized waveform into both an analog I (in phase) and Q (quadrature) waveform. The analog I and Q waveforms are then sent to the mixer or upconverter modulator 32 where they are upconverted to an L-Band, and then summed to form a low level L-Band transmit signal on line 62. This low level L-Band transmit signal is amplified by the high power amplifier 30. The resulting high level L-Band transmit signal then passes through transmit side of the diplexer 36 and is steered towards the MT antenna 14 from which it travels to the satellite 60.

The processor board 20 comprises a signal processor including a digitally implemented demodulator function, a digitally implemented modulator function, a digitally implemented receive framing function coupled to the demodulator, a digitally implemented transmit framing function coupled to the modulator function, and a digitally implemented encoding function and decoding function coupled to the transmit and receive function, respectively.

In operation, the modem processor 38 reads the received signal waveform samples from the A/D converter 28, and processes these samples as they arrive. The L-Band receive signal is mixed down to the low IF frequency to aid in signal filtering and to reduce the A/D sample rate so that the digital signal processing can keep up with the sample arrival. Once the receive signal has been sampled and loaded into the modem processor 38, all subsequent signal processing performed by modem processor 38 and codec/fax processor 39 is controlled by the control processor 40. Received signals are demodulated, in other words translated, from their waveform representation into their digital data representation, decoded and packaged for voice, fax or data processing at the codec/fax processor 39 at the user interface 16.

Figure 2:
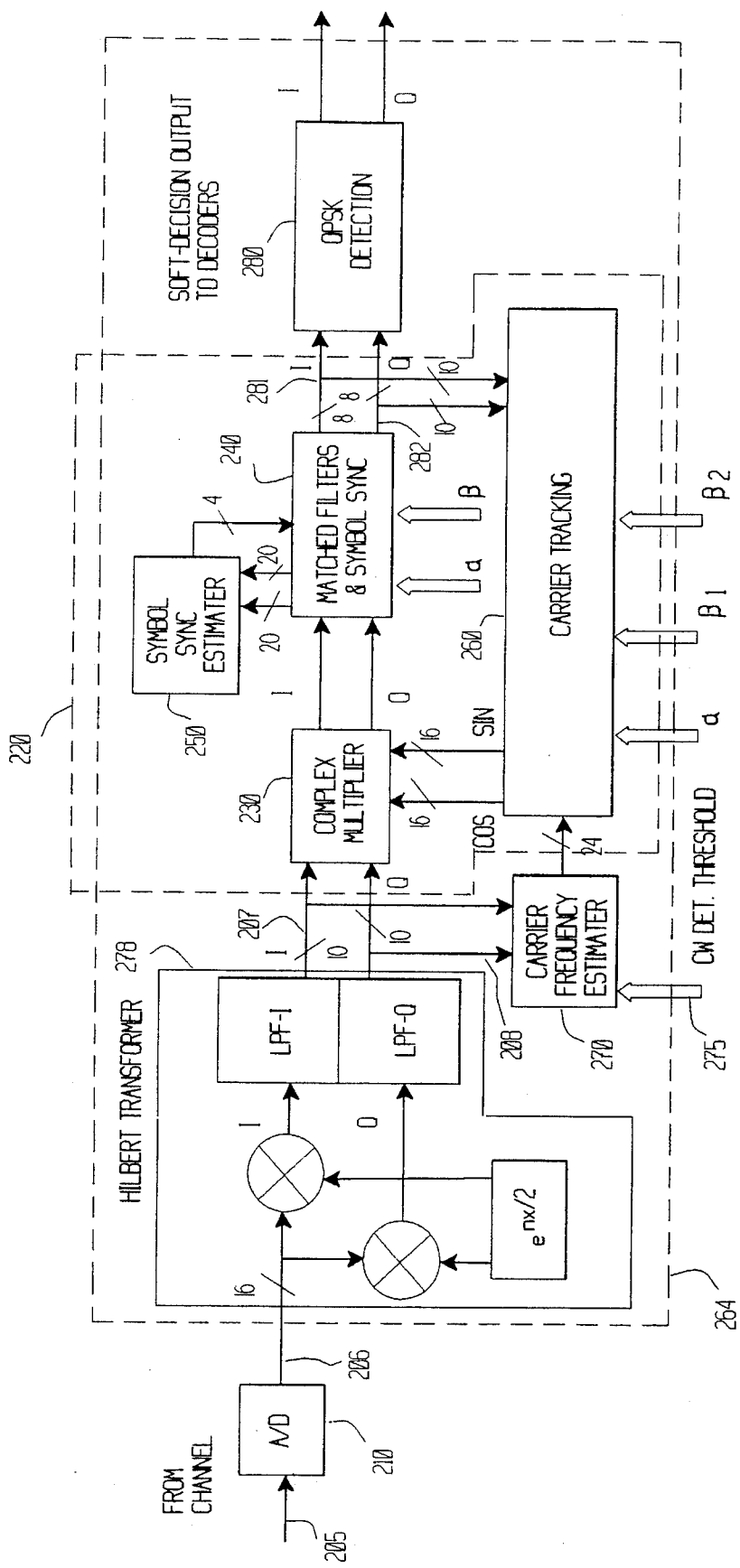
FIG. 2 is a schematic block diagram of a demodulator of the system of FIG. 1.

FIG. 2 is a schematic block diagram of a demodulator 264 of the system of FIG. 1. In FIG. 2, an analog signal 205 is received and converted to a digital signal 206 by analog-to-digital (A/D) converter 28. Signal 206 is input to Hilbert Transformer 278, which yields a digital 10-bit in-phase signal (I) 207 and a digital 10-bit quadrature signal (Q) 208. The bit widths given throughout this specification are exemplary only and should not be interpreted to limit the scope of the invention. Signals (I) 207 and (Q) 208 are input to a carrier tracking loop 220, which includes a complex multiplier 230, matched filters and symbol synchronizer 240, a symbol synchronizer estimator 250, a carrier tracking component 260, and a carrier frequency estimator 270. The output from the carrier tracking loop is input to a QPSK detector 280. The operation of carrier frequency estimator 270 is described in connection with FIGS. 3–10.

The elements of demodulator 264 preferably are embodied in instructions performed by modem processor 38 of FIG. 1, which executes a software program stored in a memory, such as a ROM (not shown). Modem processor 38 preferably is a modem processor 320C51 fixed point processor manufactured by Texas Instruments Corporation, although any processor capable of performing the process described below could be used to implement the invention.

In one implementation of the present invention, certain elements of demodulator 264, such as an oscillator and matched filter and symbol synchronizer 240, are implemented in hardware. A person of ordinary skill in the art will understand that FIGS. 2–10 represent either a hardware or a software implementation of the present invention, and that the invention is not limited to either a hardware or a software implementation. Furthermore, although the invention is described as being part of a satellite communication system, the present invention is not limited to use in such a system.

In accordance with the present invention the demodulator uses a combination of an FFT, a Discrete Fourier Transform (DFT), and three point interpolation to obtain an accurate frequency estimate for the carrier wave. As herein embodied and referring to FIG. 3, which is also illustrated separately as FIGS. 3A and 3B for convenience, a flow chart 300 illustrates a process performed by modem processor 38 of FIG. 1 to determine a frequency of the received carrier wave (CW) in carrier frequency estimator 270 of demodulator 264. An unmodulated carrier wave (CW) signal is often transmitted at the beginning of a preamble in digital radio systems so that the demodulator can determine a carrier frequency. As discussed above, the received carrier wave 207 and 208 (FIG. 2) has an unknown carrier wave frequency. The frequency estimator 270 estimates the frequency of the received carrier wave and the estimated frequency is used by the demodulator 264 to receive and decode the rest of the transmitted information.

FIG. 4 shows an example of the received carrier wave in the form of (I) signal 207 and (Q) signal 208. The carrier wave is sampled during succesive overlapping time windows. The carrier wave is received for a time period preferably lasting at least one and a half times the length of a time window W to ensure that at least one FFT window consists entirely of a carrier wave signal. In step 310 of FIG. 3, the modem processor 38 receives N/2 samples of the carrier wave (I,Q pairs), where N is, e.g., 256. The samples are taken at a sampling rate of, e.g., T=27K samples/sec. In step 320, modem processor 38 receives N/2 additional samples at the same sampling rate. Thus, the modem processor 38 receives a total of 256 samples in steps 310 and 320.

The time period during which 256 samples are taken constitute a window of data, e.g., W1, of FIG. 4. The invention checks successive 50% overlapping windows until a carrier frequency is determined. A window length is, e.g., 256/27K=9.48 msec. A sample interval (time between samples) is indicated by T, and may be, e.g., 1/27K=37 μsec. The received sampled (I, Q) pairs are preferably stored in a memory (not shown). It will be understood that the samples taken in steps 310 and 320 are taken at regular time intervals. The sampling process is not delayed by performance of the other steps of FIG. 3.

Next the modem processor 38 performs a Fast Fourier Transform (FFT) on the N samples of a current window, as described below. FFTs, which transform the sampled signal from the time domain to the frequency domain, are known to persons of ordinary skill in the art and will not be described in detail herein. For example, either of rectangular or cosine squared weighted window FFTs may be used. In step 330, the modem processor 38 performs an FFT on the data sampled in the current window to yield a plurality of energy signals corresponding to respective ones of a plurality of frequencies. The plurality of frequencies are located at 0, 1/(Nτ), 2/(Nτ), . . . , where τ is the sample interval and N is the number of samples. As shown in FIG. 5, each energy sample is stored in one of N bins, each bin corresponding to a one of the plurality of frequencies. In the described embodiment, the bins are locations in a memory of the system. In the described embodiment step 330 yields N=256 bins.

Figure 9:
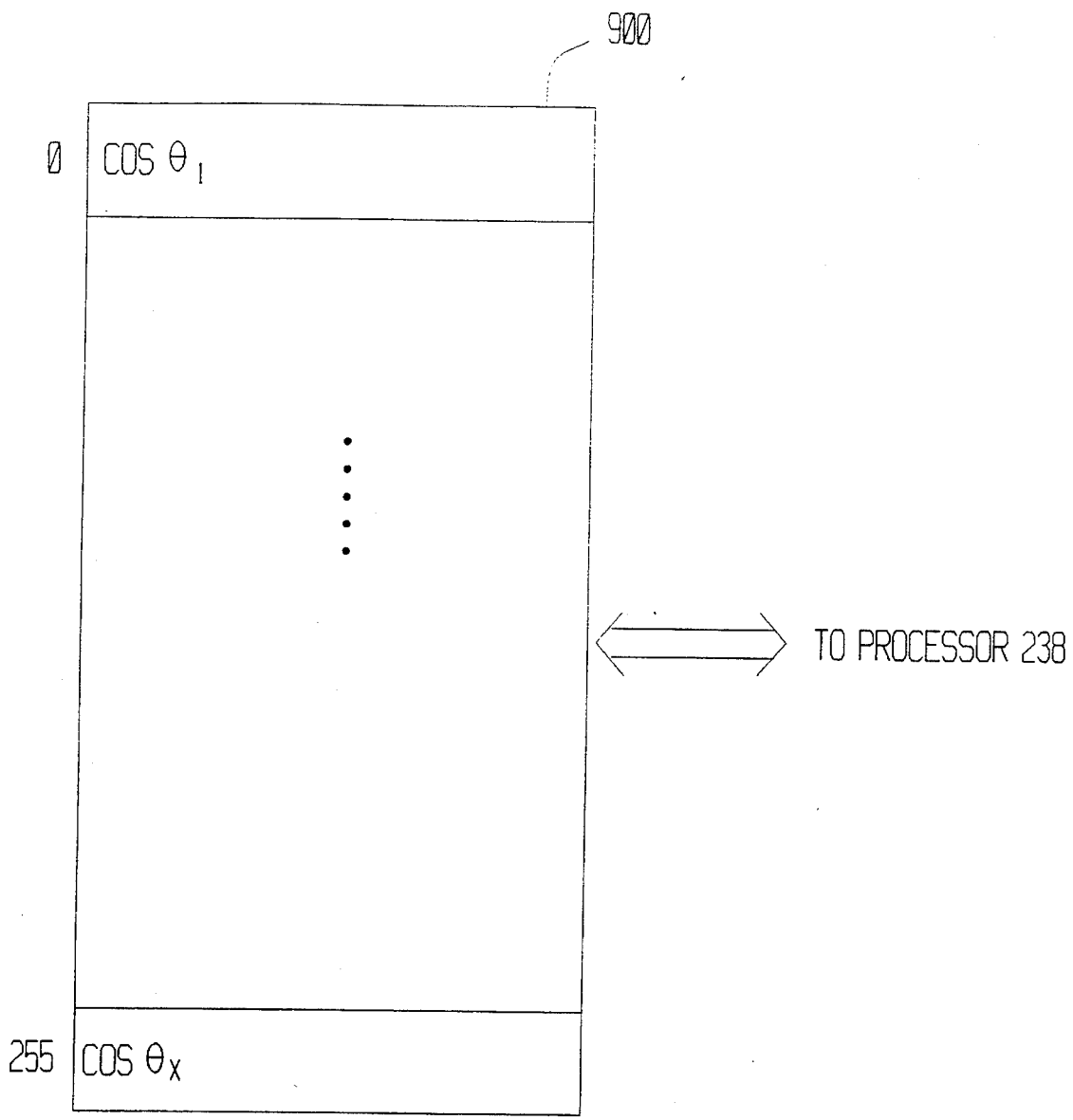
FIG. 9 is a table in a ROM used in performing the Fast Fourier Transform process.

As is known to persons of ordinary skill in the art, sine and cosine values are required to implement an FFT. FIG. 9 shows a cosine table 900 stored in a memory that is used by the modem processor 38 when performing an FFT. Cosine table 900 preferably is stored in a ROM, but may be stored in another type of memory in another embodiment. Cosine table 900 contains x=256 values for Θ=0 to 2 π. The FFT preferably is implemented as a radix 2 decimation in time (DIT) FFT. Other implementations of the table may use other types of FFTs, e.g., a radix 4 DIT FFT. The cosine table of FIG. 9 provides the coefficients required by the modem processor 38 for the FFT calculations. To obtain sine values from cosine table 900, the table address is incremented by 90°. For example, Table(0)=1=cos(0), while Table (0+90o)= 0=sin(0+90o).

Figure 3:
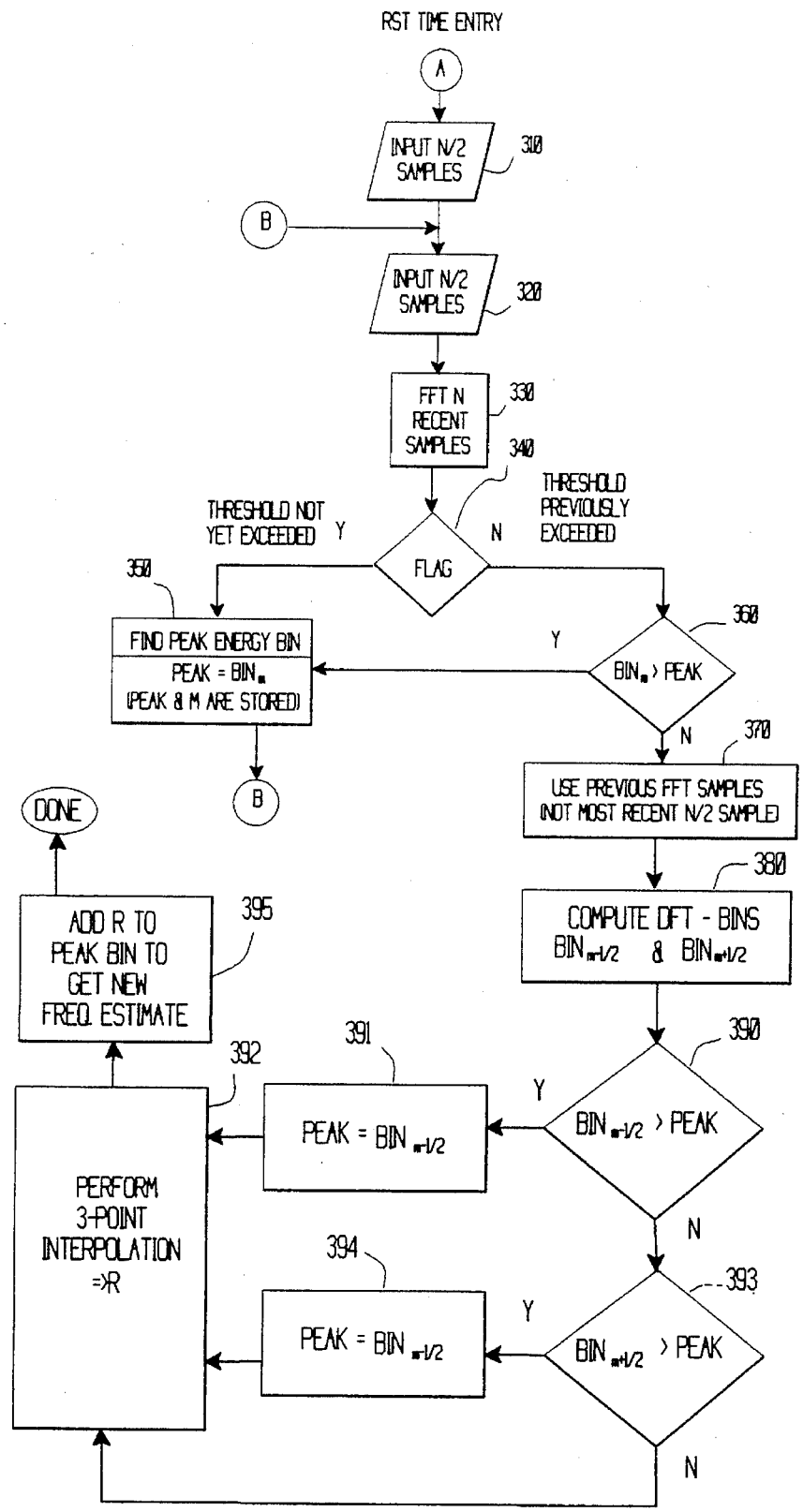
FIG. 3 is a flow chart, which is also illustrated as separated in FIGS. 3A and 3B for convenience, of a process performed by a processor of the demodulator to estimate a frequency of the received carrier wave.
Figure 3A:
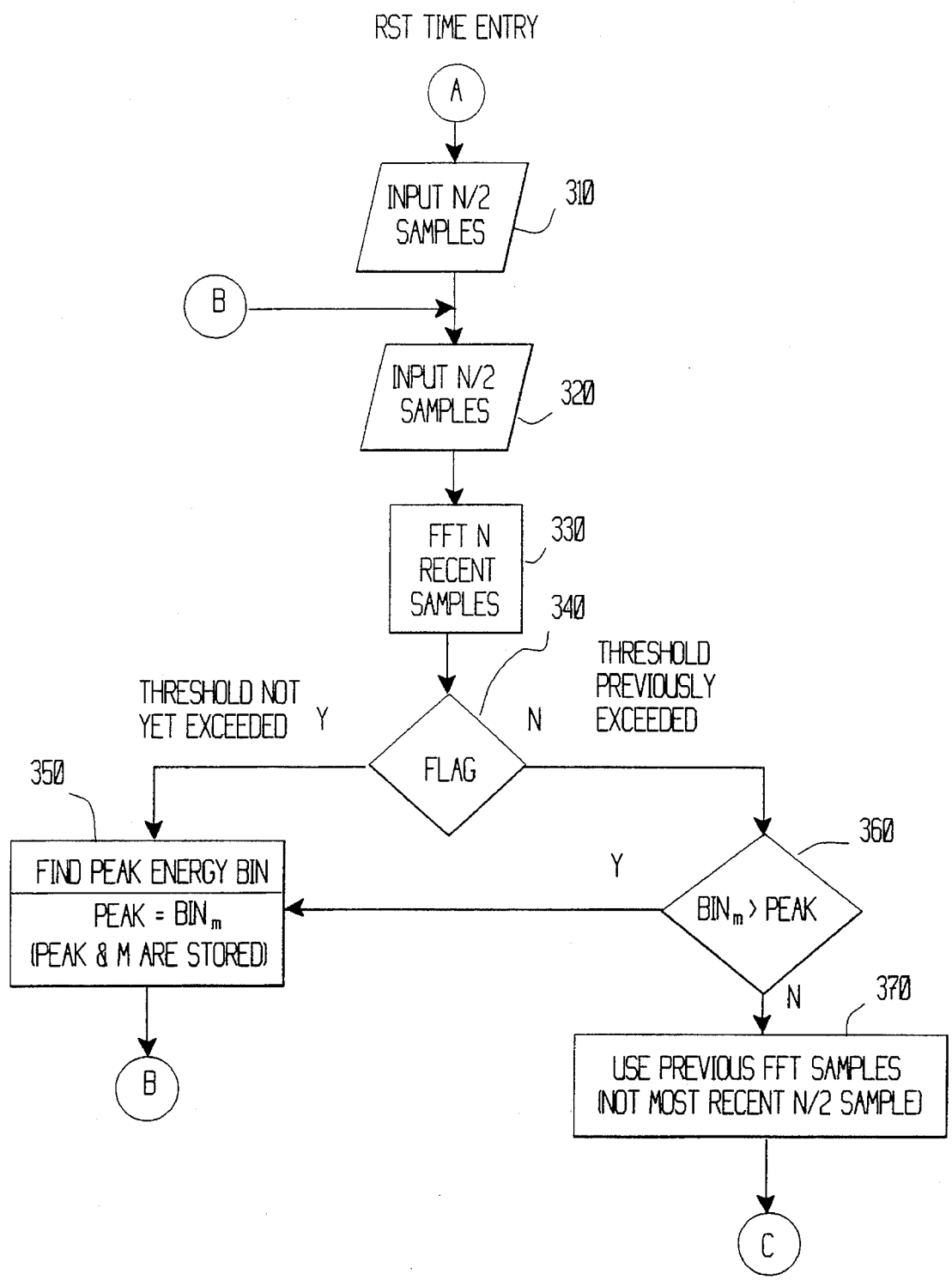
Figure 3B:
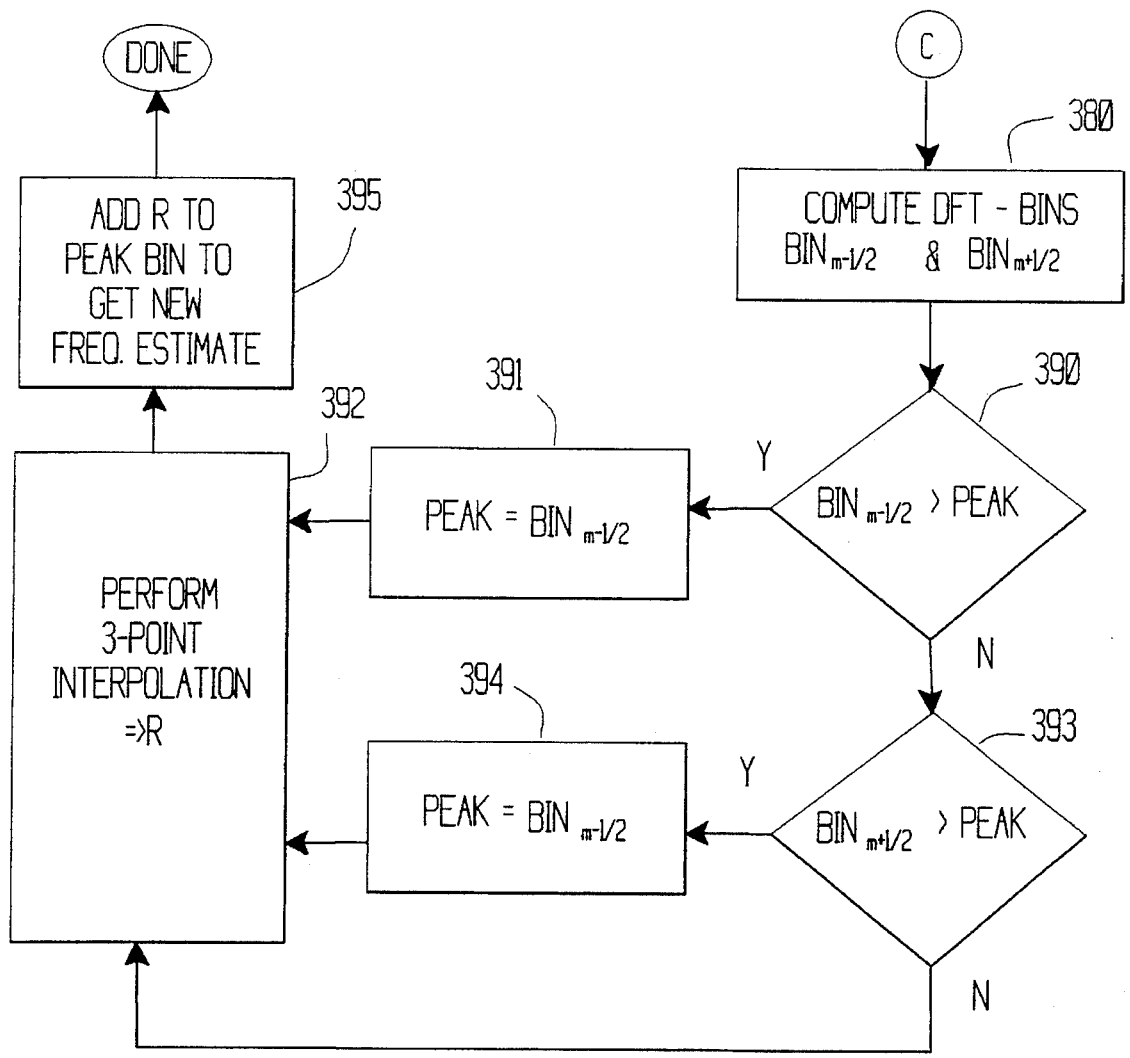

FIG. 6 is a graph showing a partial output of the FFT step 330 of FIG. 3. FIG. 6 shows the contents of three bins 610, 620, and 630. Each bin stores an energy value for a respective frequency. In step 340 of FIG. 3, if no peak previously found exceeds a predetermined threshold value, then control passes to step 350. Otherwise, control passes to step 360. In step 350, the modem processor 38 determines a largest energy in the plurality of bins by amplitude detection or square law (energy) detection. The bin having a largest energy is a "peak," is denoted by $bin_m$, and corresponds to an inexact estimate of the carrier frequency. In FIG. 6, bin 610 is $bin_{m-1}$, bin 620 is $bin_m$, and bin 630 is $bin_{m+1}$. Modem processor 38 saves the highest peak found for all windows sampled thus far. In step 360, if $bin_m$ is greater than a previously discovered peak, then control transfers to step 350 and $bin_m$ becomes a new peak. After step 350, control returns to step 320. If the test in step 360 is negative, a highest peak has been found. Step 370 indicates that the previous FFT samples (for which the highest peak was found) should be used in the following steps.

The frequency corresponding to $bin_m$ is a coarse approximation of the frequency of the carrier wave 207, 208. However, as shown in FIG. 6, $bin_m$ may not correspond exactly to the carrier wave frequency.

Once a gross carrier wave frequency is detected in steps 330–370, the modem processor 38 determines a more accurate carrier wave frequency using three point interpolation as described below. FIG. 8 is a graph showing the partial contents of two discrete Fourier Transform (DFT) bins m−½ and m+½ (810 and 820, respectively). In step 380 modem processor 38 determines the contents of $bin_{m-\frac{1}{2}}$ and $bin_{m+\frac{1}{2}}$ by the following DFT process:

$$bin_{m\pm 1/2} = \sum_{n=0}^{N-1} x_n \exp(-j2\pi n(m \pm 1/2)/N), \quad (1)$$

where m is the index of the bin containing the highest frequency energy found by the FFT (see step 330). The energy of each frequency component is computed as the sum of the squares of its real and imaginary parts. Use of the DFT bins m±½ instead of bins m±1 in the three point interpolation tends to eliminate noise in the carrier signal. Use of the m±½ bins instead of the m±1 bins also avoids bins whose magnitudes are dominated by noise, since at least one of the outer bins (m+1 or m−1) will have a low signal level. In the described embodiment, Equation (1) can be rewritten as follows.

$$bin_{m\pm 1/2} = \sum_{k=0}^{\frac{N}{2}-1} X_{2k}\exp(-j2\pi k(2m \pm 1)/N) + \sum_{k=0}^{\frac{N}{2}-1} X_{2k+1}\exp(-j2\pi(2km + m \pm k)/N)\exp(\mp j\pi/N) \quad (2)$$

Equation (2) can be approximated by:

$$bin_{m\pm 1/2} = \sum_{k=0}^{\frac{N}{2}-1} X_{2k}\exp(-j2\pi k(2m \pm 1)/N) + \sum_{k=0}^{\frac{N}{2}-1} X_{2k+1}\exp(-j2\pi k(2km \pm 1)/N)\exp(-j\pi m/N) \cdot (1 \mp j\pi/N) \quad (3)$$

The described embodiment uses Equation (3) to determine the contents of $bin_{m-\frac{1}{2}}$ and $bin_{m+\frac{1}{2}}$. Degradation due to approximating equation 2 as equation 3 is negligible because the resulting error of the DFT bin is less than $5/N^2$ (or −82 dB). The contents of bins m±½ correspond to the energy of the DFT for the frequencies corresponding to those bins. $Bin_{m-\frac{1}{2}}$ and $bin_{m+\frac{1}{2}}$ preferably are stored in a memory (see FIG. 7A).

The term "energy" instead of "amplitude" is used for describing the contents of the bins to avoid square root computations, up to this point. However, the term "amplitudes" is used in the following description. After amplitudes of the $bin_{m-\frac{1}{2}}$ and $bin_{m+\frac{1}{2}}$ are determined, the modem processor 38, in steps 390 and 393 compares the amplitudes of the DFT bins to the amplitude of the current highest bin ($bin_m$). In steps 390 or 393, if the amplitude of either $bin_{m-\frac{1}{2}}$ or $bin_{m+\frac{1}{2}}$ is higher than the amplitude of $bin_m$, then that bin becomes the new highest bin (peak) (steps 391 and 394), and is used as $bin_m$ in the following steps. In this case, the bins on either side of the new $bin_m$ are used as the new $bin_{m-\frac{1}{2}}$ and $bin_{m+\frac{1}{2}}$.

In step 392, the modem processor 38 performs a three point interpolation to determine a ratio R. This interpolation process is defined by:

$$R = \frac{(1/(4N\tau)) \cdot (|bin_{m+1/2}| - |bin_{m-1/2}|)}{|bin_{m+1/2}| + |bin_{m-1/2}| - 2|bin_m|} \quad (4)$$

FIG. 8 shows an example of the ratio R with respect to $bin_m$. Thus, R is within a range of plus or minus ½ the bin width from $bin_m$. For example, $-\frac{1}{2}N\tau \leq R \leq -\frac{1}{2}N\tau-52.7 \leq 52.7$. As shown in FIG. 7B, R is preferably stored in a memory.

The following paragraphs discuss the derivation of the ratio R. When a magnitude $|X(v)|$ of the frequency response of the FFT output is quadratic between the frequencies $(m-\frac{1}{2})/(N\tau)$ and $(m+\frac{1}{2})/(N\tau)$:

$$|X(v)| = A(1 - c\tau^2(v-v_0)^2) \quad (5)$$

where A (the signal amplitude), $v_0$ (the center frequency), and c (a constant) are unknown. Three measurements are available to determine the unknowns:

$$|bin_{m-\frac{1}{2}}| = |bin((m-/1;2)/N\tau - v_0)| = A(1 - c\tau^2((m-\frac{1}{2})/N\tau - v_0)^2) \quad (6)$$

$$|bin_m| = |bin(m/N\tau - v_0)| = A(1 - c\tau^2(m/N\tau - v_0)^2) \quad (7)$$

$$|X_{m+\frac{1}{2}}| = |X((m+\frac{1}{2})/N\tau - v_0)| = A(1 - c\tau^2((m+\frac{1}{2})/N\tau - v_0)^2) \quad (8)$$

Only one of the unknowns, $v_0$, is of interest. The solution of these three equations is straightforward once one recognizes that the first and second differences:

$$|X_{m+\frac{1}{2}}| - |X_{m-\frac{1}{2}}| \quad (9)$$

and $$(|X_{m+\frac{1}{2}}| - |X_m|) - (|X_m| - |X_{m-\frac{1}{2}}|) = |X_{m+\frac{1}{2}}| + |X_{m-\frac{1}{2}}| - 2|X_m| \quad (10)$$

are both linear in the unknowns c and A, and that the first difference is linear in $m/N\tau - v_0$ while the second difference is independent of the unknown $v_0$. Therefore, the ratio R, is linear in $m/N\tau - v_0$.

In step 395 modem processor 38 adds a signal representing the value of the ratio R to a stored quantity representing a frequency of the mth bin to yield a stored quantity representing the estimated frequency of the carrier wave. In the described embodiment, the estimated frequency is a 24-bit value. The resultant value is output from the carrier frequency estimator 270 to carrier tracking loop 220 of FIG. 2.

Figure 10:
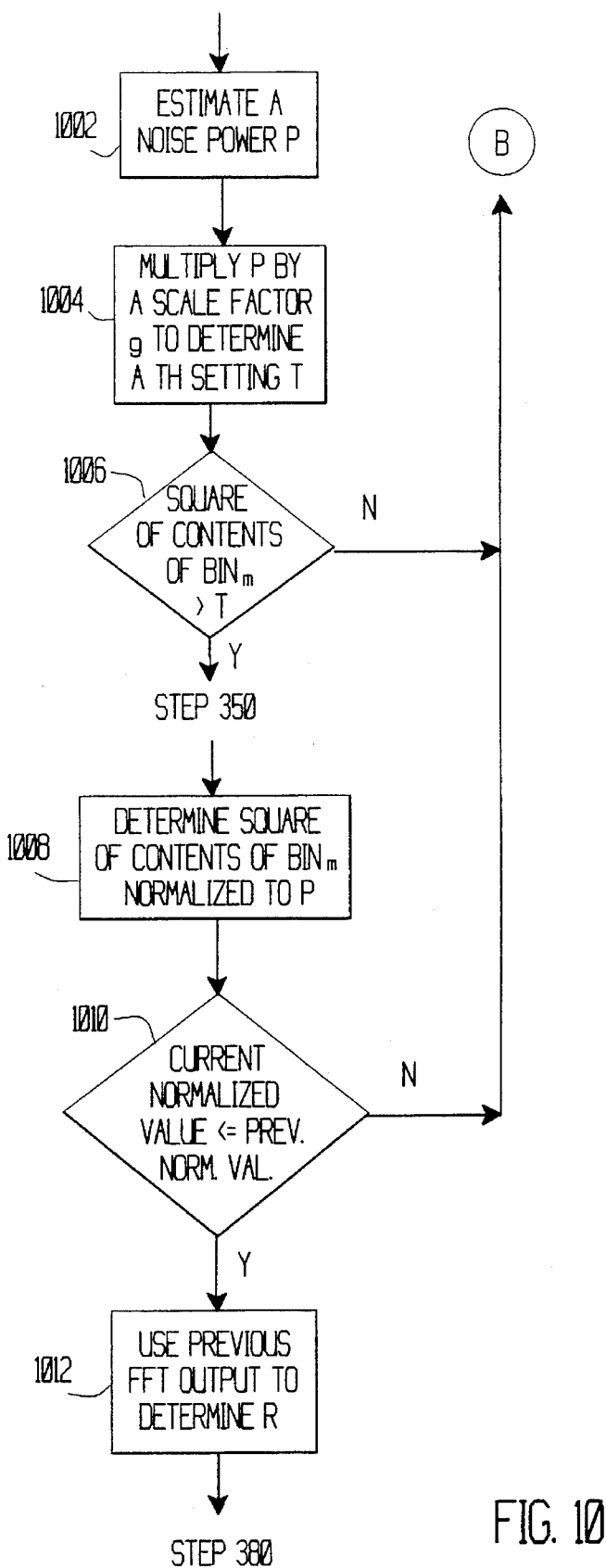
FIG. 10 is a flow chart of steps performed by the processor in another preferred embodiment of the invention.

FIG. 10 is a flow chart of steps in another preferred embodiment of the invention for a threshold similar to step 340 of FIG. 3. In FIG. 10 an FFT has been performed and a highest bin determined before step 1002. In step 1002, modem processor 38 estimates a noise power P by averaging the squares of the FFT outputs in bins m−2, m−3, ... m−19 and bins m+2, m+3, ... , m+19. Specifically, in step 1002, the modem processor 38 averages the squared amplitudes of the 36 bins surrounding the peak $bin_m$ beginning two bins away from $bin_m$. The noise power is computed in accordance with the following equation:

$$P = \sum_{k=2}^{19} (|X_{m+k}|^2 + |X_{m-k}|^2) \qquad (11)$$

The bins immediately to either side of the peak (m−1 and m+1) are excluded because those bins might contain energy from the signal of interest. FFT output beyond 19 bins from the peak may contain signals from other channels and is also not included.

In step 1004, modem processor 38 forms a threshold setting T by multiplying the noise power estimate P determined in step 1002 by a scale factor g that depends on a predetermined probability of false carrier detection and that takes into account the inaccuracy in the power estimate. The scale factor g is determined in accordance with the following paragraphs, depending on the environment in which the invention is operating.

Consider the probability distribution of the ratio $$\rho ?g? = \frac{|X_m|^2}{\Sigma |X_r|^2/K} \qquad (12)$$

where the summation in the denominator excludes the index m, and K is the number of terms in the summation. Assume that the components of $x_m$ and $x_r$ are independent, complex valued, gaussian random variables with zero means and variances equal to $\sigma^2$. Assume further that $x_m$ and $x_r$ are independent of one another. Dividing the numerator and denominator of $\rho$ by the variance $\sigma^2$ has no affect on the value of $\rho$. The random variables $|X_m|^2/\sigma_2$, $\Sigma|X_r|^2/\sigma_2$ are chi squared in two and 2K degrees of freedom. Consequently, the distribution for $\rho$ is the "F" or "variance ratio" distribution. The "variance ratio" distribution is described in Abramowiz and Stegun, "Handbook of Mathematical Functions," NBS Applied Mathematics Series 55, section 26.6, pp. 946–947, which is herein expressly incorporated by reference.

The following table shows how $\rho$ varies with the probability of false carrier detection, $P_{f0}$, for K=38.

| $P_{f0}$ | $\rho$ | $\rho$ in dB |
|---|---|---|
| 0.1 | 2.38 | 3.8 |
| 0.01 | 4.93 | 6.9 |
| 0.001 | 7.64 | 8.8 |

In step 1006, the modem processor 38 determines whether the square of the contents of $bin_m$ is greater than threshold T. If so, control passes to a step corresponding to step 360 of FIG. 3. Otherwise, control returns to step 320 of FIG. 3.

In step 1008 of FIG. 10, modem processor 38 determines the square of the contents of $bin_m$ normalized to the power estimate P. In step 1010, processor 38 compares the squared contents of $bin_m$ normalized to the power estimate P to a normalized value corresponding to the square of the peak of a previous FFT. If the current value is greater than the previous value, control returns to step 320 of FIG. 3 and another FFT is determined for a next overlapping window. If the current value is less than or equal to the previous value, control passes through step 1012 to step 390 of FIG. 3, where the frequency estimation process continues with the larger, previous value of $bin_m$. Thus, step 1010 ensures that a largest value of $bin_m$ (for successive FFTs) above an initial threshold value is used to determine a carrier wave frequency.

The present invention makes use of the quadratic shape of the filter response in the vicinity of the filter center frequency. Let $D(v\tau)$ denote the amplitude of the transfer function of the DC equivalent of the spectral analysis filters. Assume unity gain at the center frequency of the filter. Then, in the vicinity of 0, $D(v\tau)$ is of the form:

$$D(v\tau)=(1-c(v\tau)^2) \qquad (13)$$

where c is a constant. For a rectangular window, the transform function is for example:

$$\frac{\sin(\pi v\tau N)}{M\sin(\pi v\tau)} \approx 1 - ((\pi N)^2/6)\,(v\tau)^2 \qquad (14)$$

The following paragraphs show an example using equations 6–12. Assume that the terms $X_n$ of the input sequence are given by:

$$X_n = A \cdot \exp(2\pi n v\tau + \theta) \qquad (15)$$

where A is an amplitude and $\theta$ is a phase of the carrier signal. Then the amplitude of the mth FFT output is:

$$|X| = A \cdot D(v\tau - m/N) \qquad (16)$$

The maximum occurs for the value of m that satisfies:

$$(m-\tfrac{1}{2})/N < v\tau < (m+\tfrac{1}{2})/N \qquad (17)$$

The magnitudes of the DFTs corresponding to $m\pm\tfrac{1}{2}$ are:

$$|X_{m\pm\tfrac{1}{2}}| = A \cdot D(v\tau - (m\pm 1)/N) \qquad (18)$$

From the quadratic structure of $D(v\tau)$, it follows that:

$$(|X_{m+1/2}| - |X_{m-1/2}|) = A \cdot (D(v\tau - (m \pm 1/2)/N) - \qquad (19)$$

$$D(v\tau - (m - 1/2)/N) = A \cdot c \cdot ((v\tau - (m - 1/2)/N)^2 -$$

$$(v\tau - (m + 1/2)/N)^2 = A \cdot c(v\tau - m/N)2/N$$

and $$(|X_{m+1/2}| + |X_{m-1/2}| - 2|X_m| = A \cdot (D(v\tau - (m + \qquad (20)$$

$$1/2)/N) + D(v\tau - (m - 1/2)/N) - 2D(v\tau - m/M)) =$$

$$A \cdot c \cdot ((v\tau - (m - 1/2)/N)^2 + (v\tau - (m + 1/2)/N)^2 -$$

$$2(v\tau - m/N)^2) = A \cdot c/(2N^2)$$

Hence, $$R = \frac{1}{4N\tau} \; \frac{A \cdot c \cdot (v\tau - m/N)2/N}{A \cdot c/(2N^2)} = v - m/N\tau \qquad (21)$$

Thus, the invention estimates the frequency of carrier wave 205 independent of the filter shape factor c and the amplitude A in a noise free case. The invention, however, is designed to operate in a noisy environment. Analysis of the operation of the invention in a noisy environment is discussed below.

When noise is present, the analysis filter outputs are of the form:

$$X_m = A\,\exp(j\theta)F(v\tau - m/N) + N_m \qquad (22)$$

where $F(v\tau)$ denotes the (complex valued) response of the DC equivalent of the analysis filters and $N'_m$ is the noise out of the analysis filter. Note that $$|F(v\tau)| = D(v\tau) \qquad (23)$$

For rectangular weighting, $$F(\nu) = \frac{\sin(\pi\nu\tau N)}{\sin(\pi\nu\tau)} \exp(j\pi(\nu\tau(N-1))) \qquad (24)$$

The magnitude of the mth analysis filter output can be written:

$$|X_m| = |AF(\nu\tau - m/N) + N_m| \qquad (25)$$

where $$N_m = \exp(-j\theta)N'_m \qquad (26)$$

If noise is present and $\nu$ is between $(m-\frac{1}{2})/N$ and $(m+\frac{1}{2})/N$, then for a large signal to noise ratio (at the output of the analysis filters), $$|X_m| = |AF(\nu\tau-m/N) + N_m| \cong AD(\nu\tau-m/N) + Rl(N_m), \qquad (27)$$

where Rl denotes "real part of." Similarly, $$|X_{m\pm\frac{1}{2}}| \cong AD(\nu\tau - (m\pm\frac{1}{2})/N) + Rl(N_{m\pm\frac{1}{2}}) \qquad (28)$$

So, $$\frac{1}{4N\tau}(|X_{m+1/2}| - |X_{m-1/2}|) \simeq \qquad (29)$$

$$A \cdot c \cdot \frac{\nu - m/(N\tau)}{2N^2} + Rl \cdot \frac{N_{m+1/2} - N_{m-1/2}}{4N\tau}$$

and $$|X_{m+\frac{1}{2}}| + |X_{m-\frac{1}{2}}| - 2|X_m| \cong A \cdot c/(2N^2) + Rl(N_{m+\frac{1}{2}} + N_{m-\frac{1}{2}} - 2N_m) \qquad (30)$$

Therefore $$R \simeq \frac{\nu - m/(N\tau) + Rl(N_{m+1/2} - N_{m-1/2}) \cdot N/(2\tau A \cdot c)}{1 + Rl(N_{m+1/2} + N_{m-1/2} - 2N_m) \cdot (2N^2)/(A \cdot c)} \qquad (31)$$

Ignoring the second and higher order noise terms, then $$R - (\nu - m/(N\tau)) \cong Rl(N_{m+\frac{1}{2}} - N_{m-\frac{1}{2}}) \cdot N/(2\tau A \cdot c) + (\nu - m/(N\tau)) \cdot Rl(N_{m+\frac{1}{2}} + N_{m-\frac{1}{2}} - 2N_m) \cdot (2N^2)/(A \cdot c) \qquad (b\ 32)$$

Since the mean values of the noise terms are zero, the estimate is unbiased (for large signal to noise ratios).

To compute the variance of the estimate, the correlation between the various noise terms must be taken into account. For rectangular weighting, the correlation between $N_{m+\frac{1}{2}}$ and $N_{m-\frac{1}{2}}$ is zero while the correlation between $N_{m\pm\frac{1}{2}}$ and $N_m$ is approximately 0.636. Hence, $$E(|Rl(N_{m+\frac{1}{2}} + N_{m-\frac{1}{2}} - 2N_m)|^2) = 0.91\sigma^2 \qquad (33)$$

where $\sigma^2$ denotes the variance of the real part of the noise. Hence, the variance of the error is:

$$E(|R - (\nu - m/N\tau)|^2) \simeq \frac{\sigma^2 \cdot N^4}{A^2 \cdot c^2} \cdot \qquad (34)$$

$$(1/(N\tau)^2 + 4 \cdot 0.91 \cdot (\nu - m/(N\tau))^2)$$

For the rectangular window, $$\frac{c}{N^2} = (\pi^2/6) \qquad (35)$$

Moreover, $$|\nu - m/(N\tau)| \leq 1/(2N\tau) \qquad (36)$$

Therefore, the variance is bounded above by $$E(|R - (\nu - m/N\tau)|^2) \leq (0.705)^2 \cdot \frac{\sigma^2}{A^2} \cdot \frac{1}{(N\tau)^2} \qquad (37)$$

For example, consider a 43.3 dB carrier to noise at the input to a 256 point FFT with 27K Hz complex sample rate. The total noise power into the FFT is 1 dB (−43.3+10.log(27000)). Then, the noise in the real part of the mth FFT output is −25 dB (1−3−10.log(256)). Therefore, $$\frac{\sigma}{A} = 0.0562 \qquad (38)$$

Also, $$\frac{1}{N\tau} = 105.5 \qquad (39)$$

So, the RMS error (square root of the variance) is bounded above by 4.18 Hz for this example.

In the present invention, the FFT yields a gross estimate of the carrier frequency, and the DFT and three point interpolation process yields a finer estimate. The three point interpolation process tends to eliminate bias.

Other embodiments will be apparent to those skilled in the art from consideration of the specification and practice of the invention disclosed herein. It is intended that the specification and examples be considered as exemplary only, with a true scope of the invention being indicated by the following claims.

We claim:

1. A mobile terminal apparatus having a transceiver with a demodulator in a receiving portion of the transceiver, the demodulator including a frequency estimation apparatus for estimating a frequency of a received carrier wave signal of a phase shift keying system, the frequency estimation apparatus comprising:

means for receiving the carrier wave signal;

means for performing a fast Fourier transform on the received carrier wave signal and storing transform values in a plurality of bins stored in a memory, each bin containing a respective transform value indicative of an energy of a respective frequency;

means for determining which of the plurality of bins is an mth bin having a largest energy;

means for performing a three point interpolation process, to determine a ratio R representing a relationship between the energy of the mth bin and one of an $(m+\frac{1}{2})$th bin and an $(m-\frac{1}{2})$th bin; and means for adding a signal representing the ratio R to a signal representing an energy of the mth bin to output a signal representing the estimated frequency of the received carrier wave signal.

2. The mobile terminal apparatus of claim 1, wherein said means for performing a three point interpolation process comprises means for determining respective amplitudes of the $(m+\frac{1}{2})$th bin and the $(m-\frac{1}{2})$th bin.

3. The mobile terminal apparatus of claim 1, wherein said means for determining an mth bin comprises means for determining the amplitude of the mth bin.

4. The mobile terminal apparatus of claim 1, wherein said means for performing a three point interpolation process comprises means for determining a highest energy of the energies of the $(m+\frac{1}{2})$th bin, the $(m-\frac{1}{2})$th bin, and the mth bin and designating the bin having the highest energy as a new mth bin.

5. The mobile terminal apparatus of claim 1, wherein the frequency estimation apparatus further comprises a memory for storing trigonometric values, said means for performing a fast Fourier transform using the stored trigonometric values to perform the fast Fourier transform.

6. The mobile terminal apparatus of claim 1, wherein the frequency estimation apparatus further comprises threshold means for determining whether an amplitude of the mth bin exceeds a predetermined threshold value.

7. The mobile terminal apparatus of claim 1, wherein said means for receiving the carrier wave signal comprises means for sampling the carrier wave Signal during a plurality of successive overlapping windows.

8. The mobile terminal apparatus of claim 7, wherein the plurality of successive overlapping windows are rectangular windows.

9. The mobile terminal apparatus of claim 7, wherein the plurality of successive overlapping windows are cosine square weighted windows.

10. The mobile terminal apparatus of claim 1, further comprising threshold means for determining a threshold value from the carrier wave signal and for determining whether an amplitude of the mth bin exceeds the threshold value.

11. The mobile terminal apparatus of claim 1, further comprising means for comparing the normalized contents of the mth bin for successive fast Fourier transforms and choosing a frequency corresponding to an mth bin having the highest contents as the estimated frequency.

12. A method for estimating a frequency of a carrier wave signal in a phase shift keying system, the method comprising the steps of:

receiving the carrier wave signal;

performing a fast Fourier transform on the received carrier wave signal to provide a plurality of energy signals corresponding to respective ones of a plurality of frequencies;

storing transform values corresponding to the energy signals in a plurality of discrete Fourier transform bins of a memory, each bin containing a respective transform value indicative of a respective one of the plurality of frequencies;

determining which of the plurality of bins is an mth bin storing a transform value having a largest energy;

performing a three point interpolation process to determine a ratio R representing a relationship between the energy of the mth bin and one of an (m+½)th bin and an (m−½)th bin; and adding a signal representing the ratio R to a signal representing an amplitude of the mth bin to provide a signal representing the estimated frequency of the received carrier wave signal.

13. The method for estimating a frequency of a carrier wave signal of claim 12, wherein said step of performing a three point interpolation process comprises determining a highest energy of the energies of the (m+½)th bin, the (m−½)th bin and the mth bin and designating the bin having the highest energy as a new mth bin.

14. The method of estimating a frequency of a carrier wave signal of claim 12, wherein said step of performing a fast Fourier transform comprises using trigonometric values stored in the memory.

15. The method of estimating a frequency of a carrier wave signal of claim 12, wherein said step of receiving the carrier wave signal comprises sampling the received carrier wave signal during a plurality of successive overlapping windows.

16. The method of estimating a frequency of a carrier wave signal of claim 15, wherein the plurality of successive overlapping windows are rectangular windows.

17. The method of estimating a frequency of a carrier wave signal of claim 15, wherein the plurality of successive overlapping windows are cosine square weighted windows.

* * * * *